US011238411B1

(12) United States Patent
Wong et al.

(10) Patent No.: US 11,238,411 B1
(45) Date of Patent: *Feb. 1, 2022

(54) ARTIFICIAL NEURAL NETWORKS-BASED DOMAIN- AND COMPANY-SPECIFIC TALENT SELECTION PROCESSES

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,354

(22) Filed: Mar. 31, 2021

Related U.S. Application Data

(63) Continuation-in-part of application No. 17/096,643, filed on Nov. 12, 2020, now Pat. No. 10,990,928.

(30) Foreign Application Priority Data

Nov. 10, 2020 (CN) .......................... 202011243685.4

(51) Int. Cl.
*G06F 40/00* (2020.01)
*G06Q 10/10* (2012.01)
(Continued)

(52) U.S. Cl.
CPC ......... *G06Q 10/1053* (2013.01); *G06N 3/049* (2013.01); *G06N 5/022* (2013.01)

(58) Field of Classification Search
CPC ........ G06N 3/0454; G06N 20/00; G06N 5/04; G06N 5/02; G06N 5/022; G06N 5/025;
(Continued)

(56) References Cited

U.S. PATENT DOCUMENTS 5,197,004 A 3/1993 Sobotka et al. ............. 705/7.14
9,275,115 B2 3/2016 Haggar et al.
(Continued)

OTHER PUBLICATIONS

G. Koutra, S. Barbounaki, D. Kardaras and G. Stalidis, "A Multicriteria Model for Personnel Selection in Maritime Industry in Greece," 2017 IEEE 19th Conference on Business Informatics (CBI), 2017, pp. 287-294. (Year: 2017).*
(Continued)

*Primary Examiner* — Edgar X Guerra-Erazo
(74) *Attorney, Agent, or Firm* — Helen Mao; Imperium Patent Works

(57) ABSTRACT

Methods and systems are provided for adaptive recruitment computer system. In one novel aspect, the adaptive recruitment computer system generates a question bank based on a job description, selects adaptively questions from the question bank for an interview, and generates a feedback report for the candidate based on the evaluation of the candidate's answer. In one embodiment, the computer system categorizes a job requirement based on a body of knowledge (BOK) skill knowledge base, generates a question bank, selects adaptively a subset of questions from the generated question bank, wherein each question selected is based on evaluations of candidate's answers to corresponding prior questions using a recurrent neural network (RNN) model, and generates a feedback report for the candidate, wherein the feedback report using the RNN model based on evaluations of answers and a BOK candidate knowledge base, wherein the BOK candidate knowledge base receives updates from the computer system.

20 Claims, 10 Drawing Sheets

(51) Int. Cl.
*G06N 5/02* (2006.01)
*G06N 3/04* (2006.01)

(58) Field of Classification Search
CPC .... G06N 10/1053; G06N 3/049; G10L 15/16; G10L 15/22; G10L 15/063; G10L 15/02; G10L 17/04
See application file for complete search history.

(56) References Cited

U.S. PATENT DOCUMENTS

| | | | |
|---|---|---|---|
| 10,417,266 | B2 | 9/2019 | Patel et al. |
| 10,990,928 | B1* | 4/2021 | Wong .................. G06Q 10/1053 |
| 2013/0282605 | A1 | 10/2013 | Noelting ........................ 705/321 |
| 2014/0122355 | A1 | 5/2014 | Hardtke et al. ............... 705/321 |
| 2015/0026163 | A1 | 1/2015 | Haggar et al. ................ 707/723 |
| 2016/0043906 | A1* | 2/2016 | Mithani .............. G06F 3/04842 715/736 |
| 2018/0293758 | A1* | 10/2018 | Bar-On .................. G06T 9/002 |
| 2019/0213490 | A1* | 7/2019 | White ..................... G10L 15/26 |
| 2019/0318227 | A1* | 10/2019 | Bronstein ............ G06N 3/0454 |
| 2019/0385123 | A1 | 12/2019 | Sawarkar et al. |
| 2020/0082264 | A1* | 3/2020 | Guo ........................ G06N 3/08 |
| 2020/0226532 | A1 | 7/2020 | Lazarus et al. |
| 2020/0234137 | A1* | 7/2020 | Chen ................... G06N 3/0454 |

OTHER PUBLICATIONS

A. Gupta and D. Garg, "Applying data mining techniques in job recommender system for considering candidate job preferences," 2014 International Conference on Advances in Computing, Communications and Informatics (ICACCI), 2014, pp. 1458-1465. (Year: 2014).*

C. Maddumage, D. Senevirathne, I. Gayashan, T. Shehan and S. Sumathipala, "Intelligent Recruitment System", 2019 IEEE 5th International Conference for Convergence in Technology (I2CT), Bombay, India, 2019, pp. 1-6, doi: 10.1109/I2CT45611.2019. 9033836 (Year: 2019).

* cited by examiner

ARTIFICIAL NEURAL NETWORKS-BASED DOMAIN- AND COMPANY-SPECIFIC TALENT SELECTION PROCESSES

CROSS REFERENCE TO RELATED APPLICATIONS

This application is a continuation-in-part and claims priority under 35 U.S.C. § 120 from nonprovisional U.S. patent application Ser. No. 17/096,643, entitled "Adaptive Recruitment System Using Artificial Intelligence," filed on Nov. 12, 2020, the subject matter of which is incorporated herein by reference. Application Ser. No. 17/096,643 claims priority under 35 U.S.C. § 119 from Chinese Application Number CN 202011243685.4 titled "ADAPTIVE RECRUITMENT SYSTEM USING ARTIFICIAL INTELLIGENCE," filed on Nov. 10, 2020. The disclosure of each of the foregoing documents is incorporated herein by reference.

TECHNICAL FIELD

The present invention relates generally to the recruitment system and, more particularly, an adaptive recruitment system using artificial intelligence.

BACKGROUND

With the rapid development in machine-learning based artificial intelligence (AI), AI applications have grown exponentially. At the same time, the efficiency of talent recruitment is becoming more important than ever. Traditionally, recruiters from the human resource (HR) and/or recruitment firms selected candidates from a limited talent pool. The screening process for a job opening takes a large amount of human effort. AI's powerful ability to rapidly process millions of data points enables the recruiters to quickly identify high-potential candidates. Further, the explosive growth of the online community, which has extended beyond casual networking among friends and families, has increasingly attracted applications for business and professional uses. Many organizations and business units have their social media presence. Social media has been increasingly viewed as a professional platform to help businesses and job seekers connected. The vastly increased talent pool online enables AI programs to get the latest candidate profiles. On the one hand, traditional human interactive recruiting process has been laden with bias. AI-enabled auto screening process reduces potential human bias in the recruitment process. On the other hand, however, the current automatic recruiting services lack the human interaction, which provides real-time dynamic interview questions based on not only the answers but also the deep knowledge of the job requirements as well as experiences with human interactions. Further, traditionally, the feedback to the candidate is not informative and helpful to the candidate. It normally only has a decision with very little information.

Improvements and enhancement are needed for an AI-enabled recruitment system with an adaptive interview process and a detailed feedback to the candidate.

SUMMARY

Methods and systems are provided for an adaptive recruitment computer system. In one novel aspect, the adaptive recruitment computer system generates a question bank based on a job description, selects questions adaptively from the question bank during an interview with the candidate, and generates a feedback report for the candidate based on the evaluation of the candidate's answers. In one embodiment, the computer system categorizes a job requirement into a set of job skills based on a body of knowledge (BOK) skill knowledge base, generates a question bank comprising a list of questions based on the set of job skills and a BOK question knowledge base, selects adaptively a subset of questions from the generated question bank for an online interview with a candidate based on a trained learning model, wherein each question selected is based on evaluations of one or more answers from the candidate to corresponding prior questions using a recurrent neural network (RNN) model, and generates a feedback report for the candidate, wherein the feedback report based on evaluations of answers from the candidate and a BOK candidate knowledge base, wherein the BOK candidate knowledge base receives updates from the computer system. In one embodiment, each job skill has a set of attributes comprising a multi-level industry taxonomy, a skill level, and cross disciplinary references. In another embodiment, each question in the BOK question knowledge base has a skill level attribute, and wherein the generated question bank includes questions of different skill levels based on the skill level of the job skill attributes. In one embodiment, a data mining program is implemented to create and update one or more BOK knowledge bases comprising the BOK skill knowledge base, the BOK question knowledge base, and the BOK candidate knowledge base. In another embodiment, the computer system further obtains candidate information prior to the interview and generates a candidate profile and authentication information. In one embodiment, the candidate profile is generated from the candidate information based on the BOK candidate knowledge base.

In one embodiment, Deep Neural Network (DNN) or convolutional neural network (CNN) method is used to generate the knowledge base by extracting recruitment Big Data that contain information on candidates, skills and interview questions. The knowledge base is further categorized on the domain base. In another embodiment, the domain-based knowledge base is used to generate a subset of BOK knowledge bases, including the BOK candidate knowledge base, the BOK skill knowledge base, and the BOK question knowledge base. In another embodiment, the authentication information is a voice verification. In one embodiment, an original voice sample for the voice verification is obtained by extracting audio clips from an initial voice interview of the candidate. In another embodiment, the feedback report includes a deficiency report, and wherein a training recommendation list derived from the deficiency report is included. In yet another embodiment, the feedback report includes a strength report, and wherein a matching opening recommendation list derived from the strength report is included.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Reference will now be made in detail to some embodiments of the invention, examples of which are illustrated in the accompanying drawings.

Figure 1:
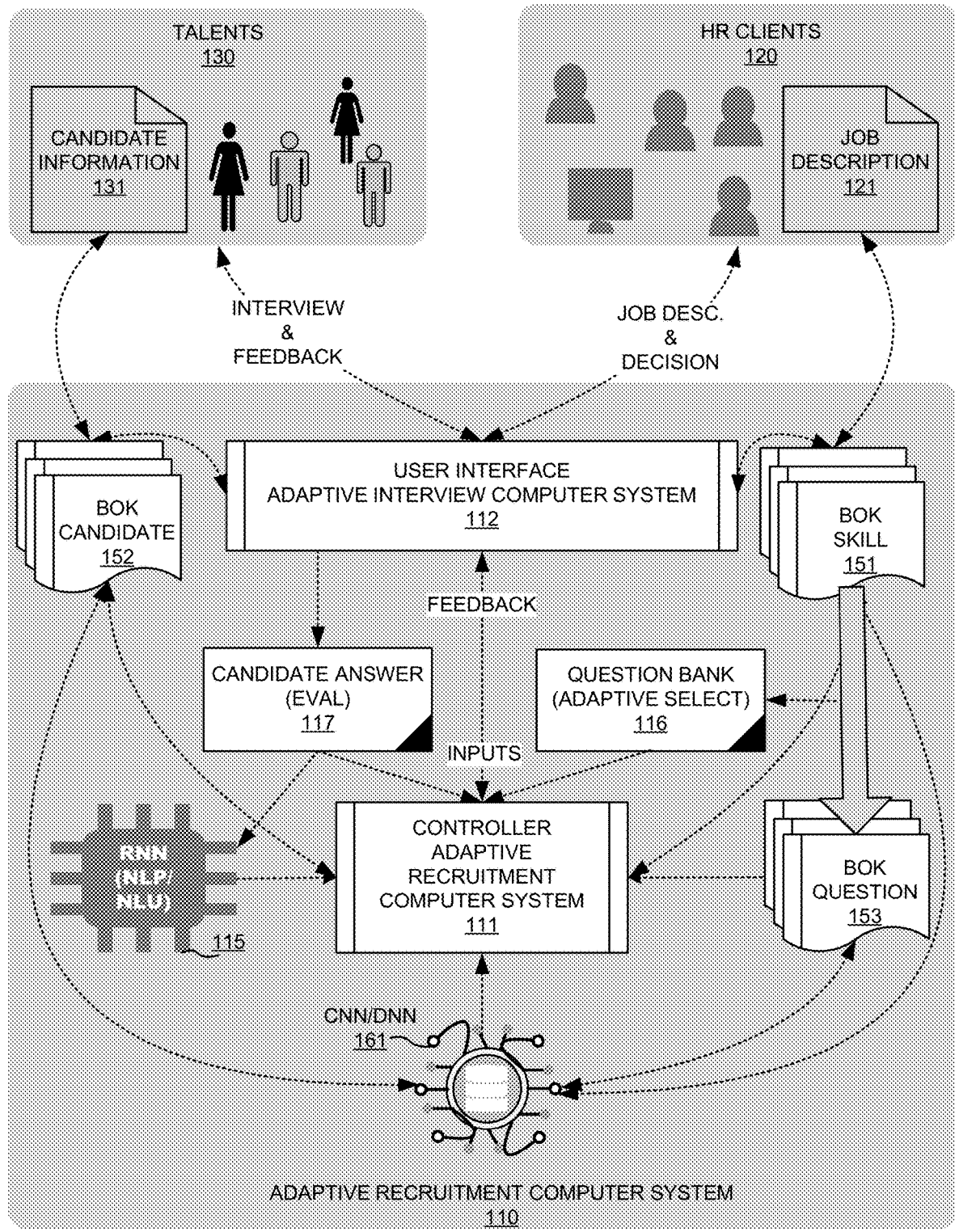
FIG. 1 illustrates exemplary diagrams for an adaptive recruitment system with feedback in accordance with embodiments of the current invention.

FIG. 1 illustrates exemplary diagrams for an adaptive recruitment system with feedback in accordance with embodiments of the current invention. An exemplary recruitment system includes speech emotion enabled computer system 110, a subsystem of human resource (HR) clients 120, a subsystem of talents 130. HR client subsystem 120 generates job descriptions 121 and gets an interview report from adaptive recruitment computer system 110. Talent 130 provides candidate information 131 and takes an interview via adaptive recruitment computer system 110. The evaluations of the answers are generated by the computer system 110. The results, both positive and negative, are sent back to the HR client 120. The evaluation results generated by computer system 110 avoids possible biases that occurred during a face-to-face or online video interview. A detailed feedback report is generated by adaptive recruitment computer system 110 and sent to talent 130.

Adaptive recruitment computer system 110 includes a controller 111, a user interface 112, a candidate answer handler and evaluation unit 117, and a question bank with adaptive selection 116. Both 117 and Controller 111 interacts with an artificial intelligence (AI) program 115 of a recurrent neural network (RNN) for natural language processing (NPL)/natural language understanding (NLU). Adaptive recruitment computer system 110 also includes the body of knowledge (BOK) knowledge base 151, the BOK candidate knowledge base 152, and the BOK question knowledge base 153. BOK skill knowledge base 151 receives updates from job description 121 of the HR client 120. BOK candidate knowledge base 152 receives updates from candidate information of the talent 130. Adaptive recruitment computer system 110 further includes machine learning unit 161. With recruitment Big Data that contain candidates, skills and interview questions, the deep neural network used in machine learning unit 161 trains, creates and updates the BOK skill knowledge base 151, BOK candidate knowledge base 152, and BOK question knowledge base 153.

User interface 112 exchanges information with external entities such as HR client 120 and talent 130. User interface 112 also interacts with other entities, such as network entities through network connections. User interface 112 receives job descriptions HR client 120. The job description identifies the skills desired. In one embodiment, the job description is in free form from the HR client 120. In another embodiment, HR client 120 fills out a canonical job requirement form 121 to generate the job description. User interface 112 sends inputs, such as the job description, to controller 111. User interface 112 receives interview results/evaluations from controller 111 and sends the results to HR client 120. In one embodiment, AI is implemented using a BOK skill knowledge base 151. BOK skill knowledge base 151 includes information to extract job skills based on the job description. In one embodiment, the controller 111 receives the job description from user interface 112 and categorizes required job skills using RNN (NLP/NLU) based on BOK skill knowledge base 151. In one embodiment, the job skill is labeled with attributes including a multi-level industry taxonomy, a skill level, and cross disciplinary references. BOK skill knowledge base 151 can be a local database or an interface to a distributed network database.

User interface 112 also interacts with talent 130 to present the interview questions to the candidate of talent 130 and receives responses from the candidate of talent 130. User interface interacts with candidate answer and evaluation unit 117, which in turn, interacts with controller 111 to generate the evaluation and feedback based on the received answers from the candidate of talent 130. In one embodiment, the responses are audio responses, which is converted into text and is analyzed using RNN (NLP/NLU) unit 115. Adaptive recruitment computer system controller 111 receives user inputs from user interface 112. Upon receiving the job description, controller 111 prepares a set of interview questions from question bank 116 based on the BOK 151, BOK question 153, and predefined rules. User interface 112 also receives candidate information 131 from talent 130. Candidate information 131 includes general candidate information and specific information for one or more job openings. In one embodiment, candidate information 131 includes the resume, recommendations, evaluation results, audio interview emotional analysis results, summarization of candidates' adaptively social media activities and events, and system ranking. In one embodiment, candidate information also includes authentication information, such as voice authentication sample extracted from the initial voice interview. In one embodiment, user interface 112 receives candidate information 131 from talents 130 and derives a detailed candidate profile using RNN (NLP/NLU) based on BOK skill knowledge base 151. BOK candidate knowledge base 152 receives updates from controller 111.

BOK question knowledge base 153 stores a plurality of interview questions. The interview questions are categorized based on predefined rules and from the BOK question knowledge base. For example, each question may include attributes to identify the category, subcategory, skill level, related area, and optionally follow up question index. Based on the job description, a list of questions is selected based on BOK question knowledge base 153. The list of questions is referred to as question bank 116. The attributes of the interview questions in question bank 116 are used to associate with requirements from the job description and the rules/criteria. In one embodiment, question bank 116 receives information from user interface 112 and updates the interview questions based on the received information. The question bank update information includes one or more updates including updated questions, updated attributes of the question, such as a category, a subcategory of the question, updated rules for question selection, and other interview question related information. Controller 111 obtains interview questions from the question bank based on the job descriptions and one or more selection rules.

Controller 111 interacts with user interface 112, candidate answer and evaluation 117, and question bank 116. In one embodiment, controller 111 is a multi-processor controller. In other embodiments, controller 111 runs on one or more devices. Controller 111 receives job description from user interface 112 and generates interview questions. In one embodiment, an analysis is performed on the received job description to generate one or more interview question selection rules. In one embodiment, a set of interview questions is prepared by getting a subset of questions from BOK question knowledge base 153. The subset of the questions of question bank 116 is selected from BOK question knowledge base 153 based on analysis using BOK skill knowledge base 151 and one or more rules, such as industry match and skill level match. Upon generating the set of interview questions, controller 111 arranges user interface 112 to conduct the interview with the candidate of talents 130. In one embodiment, each question is selected adaptively from question 116. User interface 112 sends the answer audio in response to a question to controller 111. Controller 111 analysis the answer audio and generates evaluation results. In one embodiment, controller 111 uses RNN(NLP/NLU) model 115 to analyze the text transcribed from the speech audio of the candidate of talents 130 and generates an assessment result, which is an assessment of the correctness of the answer to the question. In other embodiment, emotional classifiers are also generated by analyzing the candidate answer. In one embodiment, the speech emotion classifier is generated using the CNN LSTM model. The generated emotion classifier is mapped to the sentiment classifier. The combination of the assessment result and the emotional classifier are summarized to the evaluation results.

In one embodiment, the evaluation results of one or more prior answers by the candidate are used to select the next question from question bank 116. The adaptive interview question selection enables an adaptive interview procedure, which is more accurately analyzed using AI technology, such as RNN(NLP/NLU) 115, and provides a more efficient way to evaluate the strength, weakness, and fit-ability of the candidate. The AI-enabled adaptive recruitment computer system 110 enhances the performance by using up-to-date knowledge, including BOK skill knowledge base 151, BOK candidate knowledge base 152, and question knowledge base 153. A machine learning unit 161 interacts and updates BOK skill knowledge base 151, BOK candidate knowledge base 152 and BOK question knowledge base 153. In one embodiment, machine learning unit also interacts with controller 111 and updates BOK skill knowledge base 151, BOK candidate knowledge base 152, and BOK question knowledge base 153 bases on instructions from controller 111. In one embodiment, machine learning unit 161 uses Deep Neural Network (DNN) method to generate the knowledge base by extracting recruitment Big Data. The knowledge base is the domain knowledge that is used to guide the search or evaluate the resulting patterns. Such knowledge can include concept hierarchies used to organize attributes or attribute values into different levels of abstraction. Knowledge such as user beliefs, which can be used to assess a pattern's interestingness based on its unexpectedness, may also be included. Other examples of domain knowledge are additional interestingness constraints or thresholds and metadata. The knowledge base is categorized on the domain base. In another embodiment, the domain-based knowledge base is used to generate a subset of BOK knowledge bases, including the BOK candidate knowledge base, the BOK skill knowledge base, and the BOK question knowledge base. In one embodiment, machine learning unit 161 is distributed on the network and interacts with other modules of computer system 111 through the network interface. BOK skill knowledge base 151, BOK candidate knowledge base 152 and BOK question knowledge base 153 are based on the domain-specific knowledge base. Each of the BOK knowledge base, including the BOK skill knowledge base 151, BOK candidate knowledge base 152, and BOK question knowledge base 153, includes multiple baby BOKs, one for each domain. When a knowledge base is generated for a domain by scraping a domain-specific Big Data, each baby BOK of the domain is created. The adaptive algorithms are carried out based on each BOK knowledge base.

Figure 2:
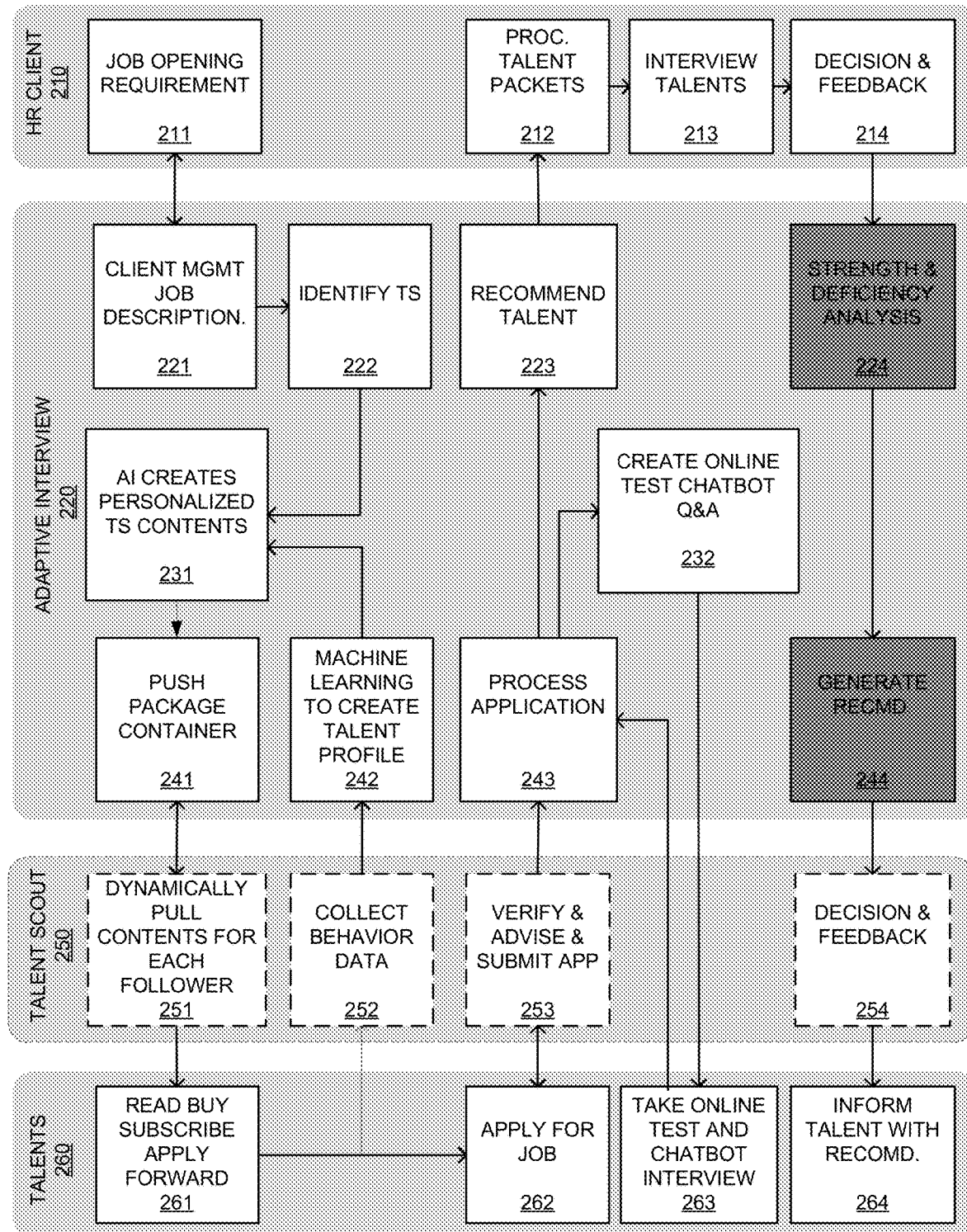
FIG. 2 illustrates exemplary diagrams of recruitment system with HR clients, the adaptive recruitment computer system, optionally talent scouts and talents in accordance with embodiments of the current invention.

FIG. 2 illustrates exemplary diagrams of recruitment system with HR clients, the adaptive recruitment computer system, optionally talent scouts (TS), and talents, i.e. candidates, in accordance with embodiments of the current invention. An adaptive recruitment system includes an HR client subsystem 210, an adaptive recruitment computer system 220, a talent scout subsystem 250, and a talent subsystem 260. HR subsystem 210 includes multiple processing and/or function modules such as a job opening requirement module 211, a processing talent packets module 212, an interview talent module 213, and a hiring decision and feedback module 214. Adaptive recruitment computer system 220 includes one or more modules interacting with HR client 210, including a client management and job description module 221, an identifying TS module 222, a recommendation to talents module 223, and a strength and deficiency analysis module 224. Adaptive recruitment computer system 220 also includes internal modules such as an AI-enabled personalized contents for TS creator 231 and an online test and chatbot Q&A management module 232. Adaptive recruitment computer system 220 further includes modules that interact with talent scouts, such as push package container module 241, a machine-learning-based creator for talent profile 242, an application processing module 243, and a recommendation generator 244. Talent scout subsystem 250 includes a process to dynamically pull content from the container for each follower 251, a behavior data collector 252, an application verification, advising and submission 253, and a hiring decision, deficiency report, and recommendation processing 254. Talent subsystem 260 includes a read, buy, subscription, applying and forwarding collector 261, a job application processing 262, an online test and chatbot interview 263, and a recommendation and feedback receiver 264. Each subsystem includes one or more components such as software, hardware, and firmware to implement its functions. It can be run on a single apparatus or run over multiple apparatuses. Each module of the subsystems can be implemented in software, hardware, firmware, and combinations of above. Each subsystem has at least one processor coupled with at least one memory unit, one or more storage devices, and optionally communication hardware and software to communicate internally and externally of the subsystem.

In one embodiment, client management 221 gets job opening requirements from 211 and identifies TS based on the job opening requirements. The information of the identified TS and feedback information of talent behavior profile are inputs for AI-enabled personalized contents creator 231. The talent behavior profile is generated by a machine-learning with data collected by a talent scout from his/her followers. Module 231 generated personalized recruitment contents based on the job requirement and packs pushes to corresponding TS through container 241. When a talent applies for a job through the recruitment information published by the TS, the application is processed by TS subsystem 250 with module 253 for verification and submission. The application is processed in application processor 243. If 243 determines the application meets a threshold requirement, adaptive recruitment computer system 220 creates an online test and/or a chatbot Q&A. The applicant of the talent subsystem takes the online test and/or participated in the chatbot interview. The results are passed to HR client 210. When a hiring decision is made, HR client subsystem notifies adaptive recruitment computer system 220. Adaptive recruitment computer system 220 generates recommendation and/or feedbacks and sends to the TS. The applicant of the talent subsystem receives hiring decisions and/or recommendations from the TS subsystem 250.

Figure 3:
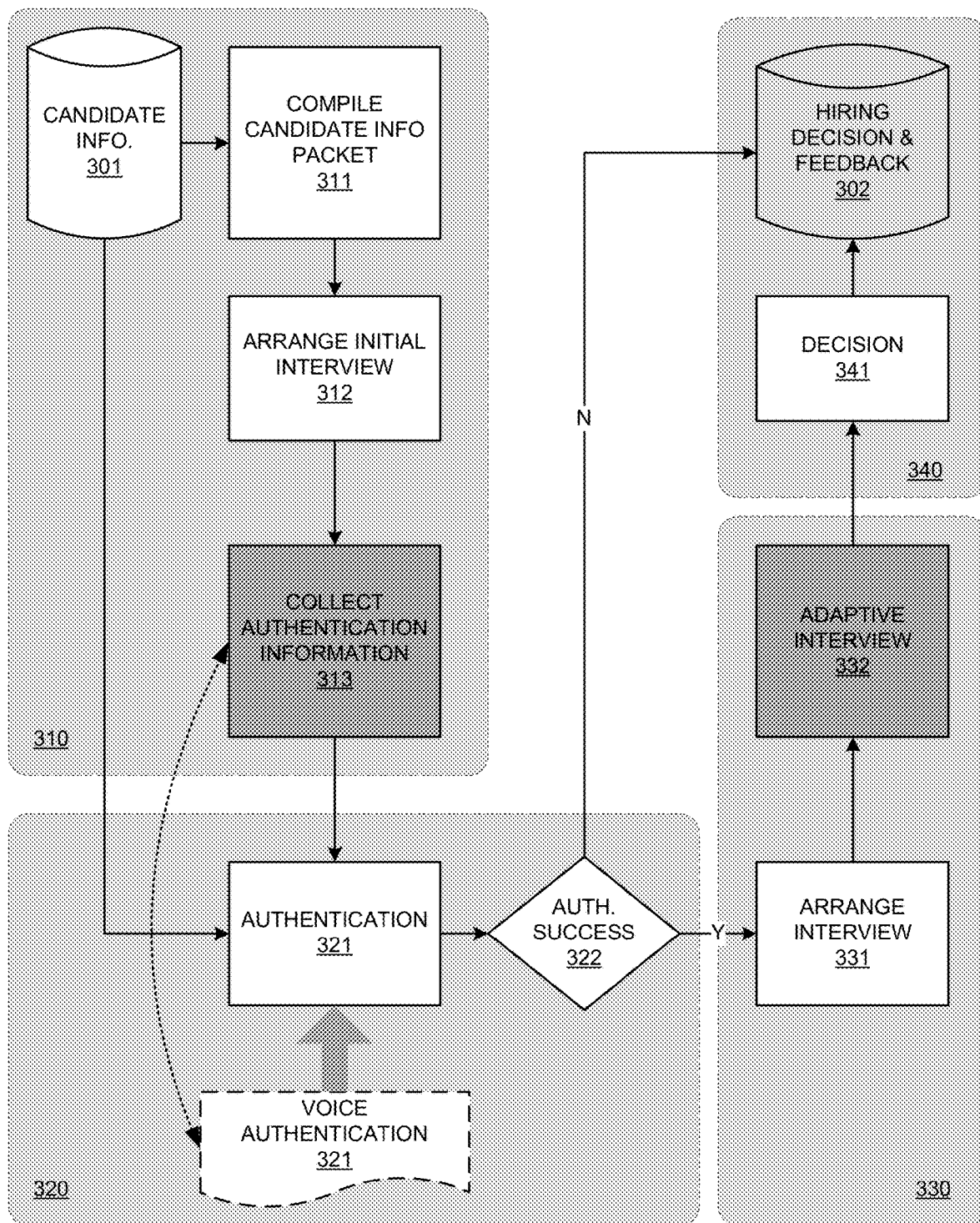
FIG. 3 illustrates exemplary diagrams for an adaptive recruitment procedure with adaptive interview, authentication, and feedback procedures in accordance with embodiments of the current invention.

FIG. 3 illustrates exemplary diagrams for an adaptive recruitment procedure with the adaptive interview, authentication, and feedback procedures in accordance with embodiments of the current invention. In one novel aspect, an adaptive interview is conducted using AI-enabled computer-based recruitment system. Procedure-wise, the adaptive recruitment system includes multiple procedures. Procedure 310 collects candidate information and generates candidate profile including authentication information; procedure 320 performs authentication, procedure 330 conducts adaptive interview; and procedure 340 generates feedback to the candidate. In procedure 310, the adaptive recruitment system collects information from potential candidates in an initial phase. At step 301, candidate information 301 is collected. Candidate information takes various formats and comes to the system on different channels. In one embodiment, the candidate information is collected through a third-party channel, such as Talent Scout (TS). The candidate information includes one or more subjects, including resume, recommendations, and reference list. The candidate information is updated throughout the process, including initial interview evaluation, audio/video assessment results, and authentication information. In one embodiment, the authentication is a candidate's voice sample extracted from an interview. At step 311, the candidate information packet is compiled. In one embodiment, the information packet is compiled based on a template. The template is selected based on a template group based on user input or analysis results from the adaptive recruitment computer system. At step 312, an interview is arranged. In one embodiment, the initial interview, such as the interview at step 312, is arranged by the adaptive recruitment system based on input from the candidate, the HR client, and the job description. In one embodiment, the content of the interview and style of the interview are selected using an AI platform based on the input information. At step 313, authentication information is collected. In one embodiment, voice authentication 321 is used for follow-up interviews. Step 313 collects a voice sample of the candidate for future authentication purposes.

Authentication procedure 320 is conducted by the adaptive recruitment computer system to authenticate the candidate using the authentication information in the candidate profile. At step 321, the authentication is performed. In one embodiment, the authentication is a voice authentication based on the candidate's voice sample in the candidate profile. Step 322 checks whether the authentication is successful. If step 322 determines no, a hiring decision and/or feedback report is updated based on the authentication failure information. If step 322 determines yes, adaptive interview procedure 330 starts. At step 331, an adaptive interview is arranged. The arrangement of the interview is input from the candidate, the HR client, previous interview assessment results, and job description. At step 332, an adaptive interview is conducted. In one embodiment, the adaptive interview selects each question from the question bank adaptively. The candidate's answer is evaluated in real time and the results is used to select the next question. With the adaptive selection of each question, the interview is more efficient and accurate. The feedback procedure 340 makes decision at step 341. The decision and the evaluation of each answer is used to generate the feedback report at step 302. The results are also used to update the learning model, e.g. the BOK candidate knowledge base, the BOK skill knowledge base, and the BOK question knowledge base.

In one novel aspect, a feedback report with recommendations is generated for the candidate. Unlike the traditional feedback after a recruitment procedure, the adaptive recruitment computer system generates a detailed feedback report for the candidate based on the evaluation and BOK skill knowledge base, BOK question knowledge base, and other related information using data mining. Recommendations also generated using data mining based on the result of the interview process.

Figure 4:
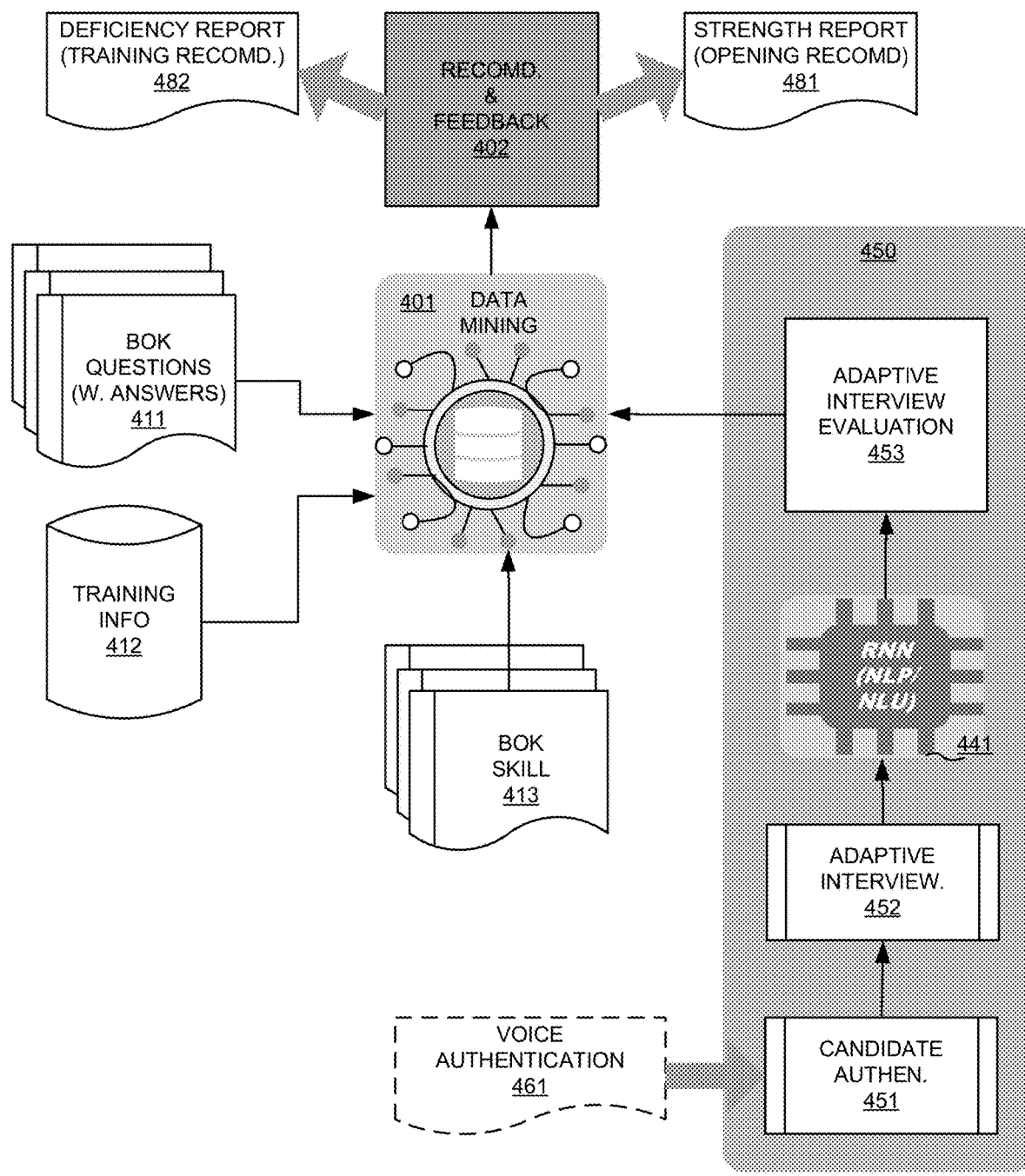
FIG. 4 illustrates exemplary diagrams for the feedback report generation by the adaptive recruitment computer system in accordance with embodiments of the current invention.

FIG. 4 illustrates exemplary diagrams for the feedback report generation by the adaptive recruitment computer system in accordance with embodiments of the current invention. A data mining unit 401 produces a recommendation and feedback report 402. An adaptive interview evaluation result is generated in adaptive interview procedure 450. At step 451, candidate authentication is performed. In one embodiment, the authentication is a voice authentication 461. At step 452, an adaptive interview is conducted. The audio answers from the candidate are converted to text to be evaluated by RNN(NLP/NLU) unit 441. The assessment result of the adaptive interview is generated at step 453. The evaluation/assessment result of the adaptive interview procedure 450 is one input for the data mining unit 401. In one embodiment, other factors are used to generate the recommendation and feedback report 402. The inputs to data mining 401 include BOK question with answers knowledge base 411, BOK skills knowledge base 413, and training information 412. In one embodiment, the feedback report includes a deficiency report 482. The deficiency report 482 is generated based on the adaptive interview assessment/evaluation results, a BOK candidate profile knowledge base, a BOK skills knowledge base. The assessment/evaluation results are compared with the candidate profile database. In one embodiment, the candidate is compared to his peers in the same or similar industry sector. In on embodiment, in the deficiency report 482, data mining 401 matches one or more deficiencies with training information 412 based on one or more predefined rules. One or more training programs are recommended and included in the feedback report. The training recommendations are selected based on the specific area for the candidate based on the deficiency report. In another embodiment, the feedback report includes a strength report 481. In one embodiment, a matching opening recommendation list is included the strength report 481 based on the strength of the candidate. The recommendation list is generated based on the assessment/evaluation result and a job opening database. In one embodiment, deficiency report 482 and strength report 481 are generated based on the HR hiring decision and the report from the HR. Data mining 401, based on the feedback from the HR, analyzes the feedback reports based on the BOK knowledge base. For example, if a software developer candidate has a weakness of his lacking software pattern knowledge, data mining 401 based on the BOK skill knowledge base and the candidate's profile, identifies that the candidate also lacks training of object-oriented design. Similarly, if one strength of a marketing manager candidate is his outspokenness and positive thinking, data mining 401 based on the BOK knowledge base and the candidate's profile, identifies that the candidate could use some leadership and project management training to further enhance his professional career. In one embodiment, a ranking is provided in the strength report 482 and/or the deficiency report 481.

Figure 5:
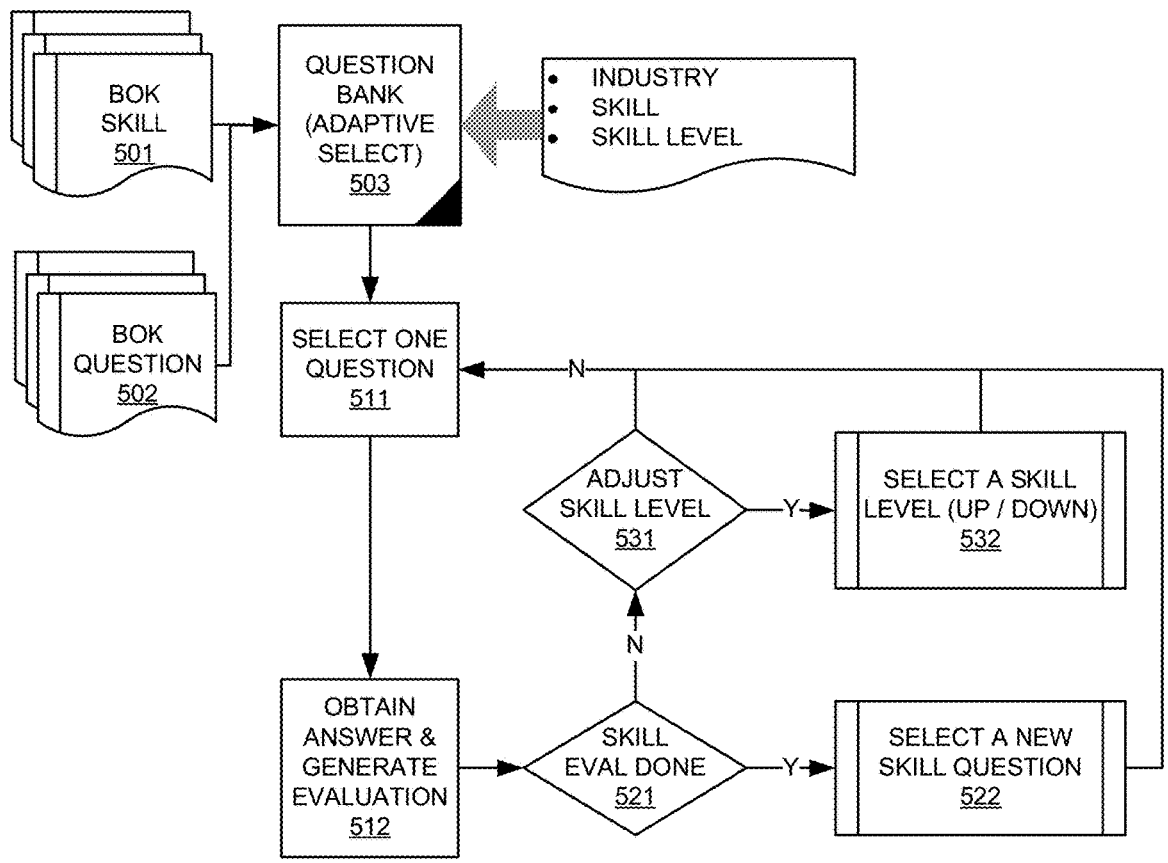
FIG. 5 illustrates exemplary diagrams for an adaptive interview by selecting questions from a question bank based on candidate's prior answers in accordance with embodiments of the current invention.

FIG. 5 illustrates exemplary diagrams for an adaptive interview by selecting questions from a question bank based on the candidate's prior answers in accordance with embodiments of the current invention. In one embodiment, a question bank 503 is generated using an RNN model based on BOK skill knowledge base 501 and BOK question knowledge base 502. Question bank 503 includes a list of questions. Each question is assigned/labeled with one or more attributes including an industry taxonomy, a skill name/index, and a skill level. At step 511, a question is selected from question bank 503 based on the evaluation of the candidate's prior answers. At step 512, the candidate's answer to the selected question is obtained and evaluated. In one embodiment, both the answer to the question and the emotional factor of the answer are evaluated. The evaluation of this question and evaluations of the prior questions are combined to generate a skill evaluation report. At step 521, the adaptive recruitment computer system determines if the skill evaluation for the current skill is concluded. In one embodiment, the combined assessment/evaluation is done using an RNN model based on a BOK question with answers knowledge base. The skill evaluation is done when the combination evaluation indicates a skill level requirement satisfied or a skill level requirement not satisfied and a predefined threshold of trying is reached. If step 521 determines yes, the adaptive recruitment computer system, at step 522, selects a new question designed for a new skill. The new skill is selected based on the BOK skill knowledge base 501. If step 521 determines no, the adaptive recruitment computer system moves to step 531 and determines if the current skill level needs to be adjusted. If step 531 determines yes, a new question with a higher or a lower level is selected. If step 531 determines no, a new question in the same skill set and the same skill level is selected.

Figure 6:
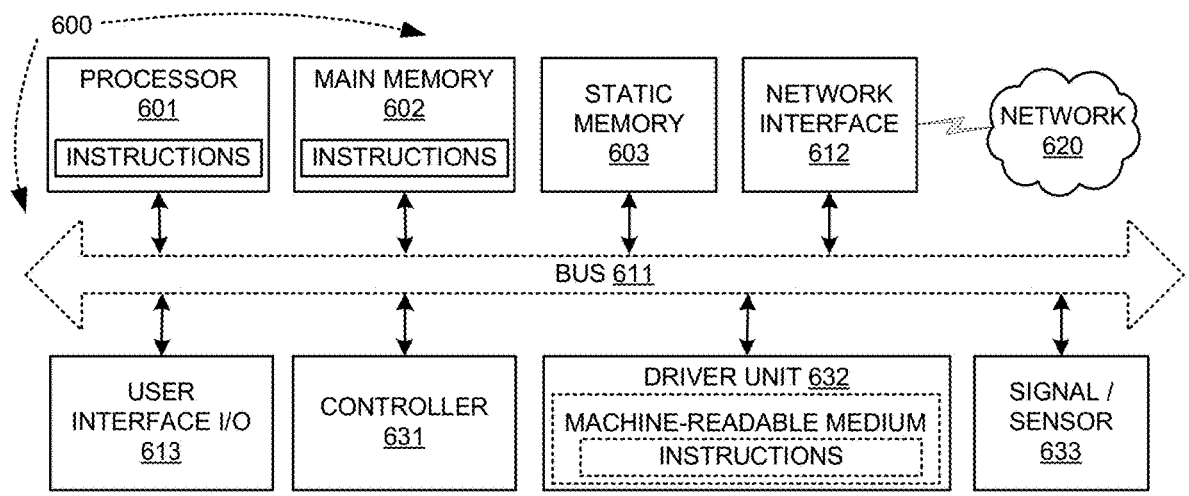
FIG. 6 illustrates an exemplary block diagram of a machine in the form of a computer system performing the adaptive recruitment in accordance with embodiments of the current invention.

FIG. 6 illustrates an exemplary block diagram of a machine in the form of a computer system performing the adaptive recruitment in accordance with embodiments of the current invention. In one embodiment, apparatus/device 600 has a set of instructions causing the device to perform any one or more methods for speech recognition used for interview questions. In another embodiment, the device operates as a standalone device or may be connected through a network to other devices. Apparatus 600 in the form of a computer system includes one or more processors 601, a main memory 602, a static memory unit 603, which communicates with other component through a bus 611. Network interface 612 connects apparatus 600 to network 620. Apparatus 600 further includes user interfaces and I/O component 613, controller 631, driver unit 632, and signal and/or sensor unit 633. Driver unit 632 includes a machine-readable medium on which stored one or more sets of instructions and data structures, such as software embodying or utilize by one or more methods for the speech recognition function. The software may also reside entirely or partially within the main memory 602, the one or more processor 601 during execution. In one embodiment, the one or more processor 601 is configured to categorize a job requirement into a set of job skills using a recurrent neural network (RNN) based on a body of knowledge (BOK) skill knowledge base; generate a question bank comprising a list of questions based on the set of job skills and a BOK question knowledge base; select adaptively a subset of questions from the generated question bank for an online interview with a candidate based on a predefined rule, wherein each question selected is based on evaluations of one or more answers from the candidate to corresponding prior questions using a RNN model; and generate a feedback report for the candidate, wherein the feedback report using the RNN model based on evaluations of answers from the candidate and a BOK candidate knowledge base, wherein the BOK candidate knowledge base receives updates from the computer system. In one embodiment, software components running the one or more processors 601 run on different network-connected devices and communicate with each other via predefined network messages. In another embodiment, the functions can be implemented in software, firmware, hardware, or any combinations.

Figure 7:
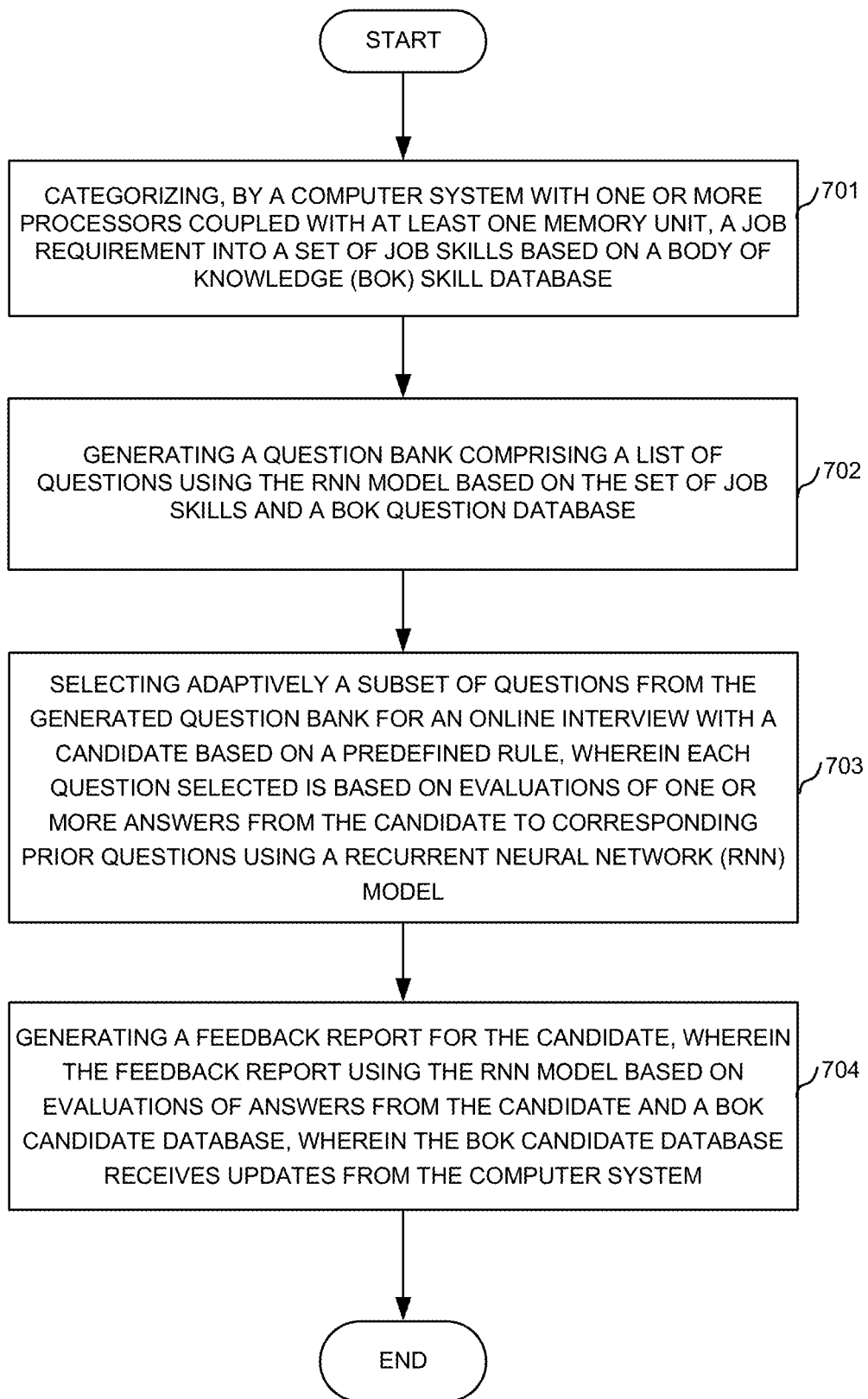
FIG. 7 illustrates an exemplary flow chart for the adaptive recruitment computer system with the adaptive interview and feedback report in accordance with embodiments of the current invention.

FIG. 7 illustrates an exemplary flow chart for the adaptive recruitment computer system with adaptive interview and feedback report in accordance with embodiments of the current invention. At step 701, the computer system categorizes a job requirement into a set of job skills based on a body of knowledge (BOK) on skills. At step 702, the computer system generates a question bank comprising a list of questions using the RNN model based on the set of job skills and a BOK question knowledge base. At step 703, the computer system selects adaptively a subset of questions from the generated question bank for an online chatbot interview with a candidate based on a set of predefined rules, wherein each question selected is based on evaluations of one or more answers from the candidate to corresponding prior questions using a recurrent neural network (RNN). At step 704, the computer system generates a feedback report for the candidate, wherein the feedback report using the RNN model based on evaluations of answers from the candidate and a BOK candidate knowledge base, wherein the BOK candidate knowledge base receives updates from the computer system.

Analytic Hierarchy Process (AHP) with Machine Learning

In one novel aspect, the adaptive recruitment system generates a group of primary candidates who meet the basic job requirements. This group of qualified candidates are further ranked using the AHP based on input from the HR with criteria and optionally sub-criteria. Though the detailed information is provided for the candidate identification process, AHP also applies to further optimize the feedback process in 254 in similar ways. In one embodiment, the recommendation to the candidate based on the result applies the AHP in similar manners.

Figure 8:
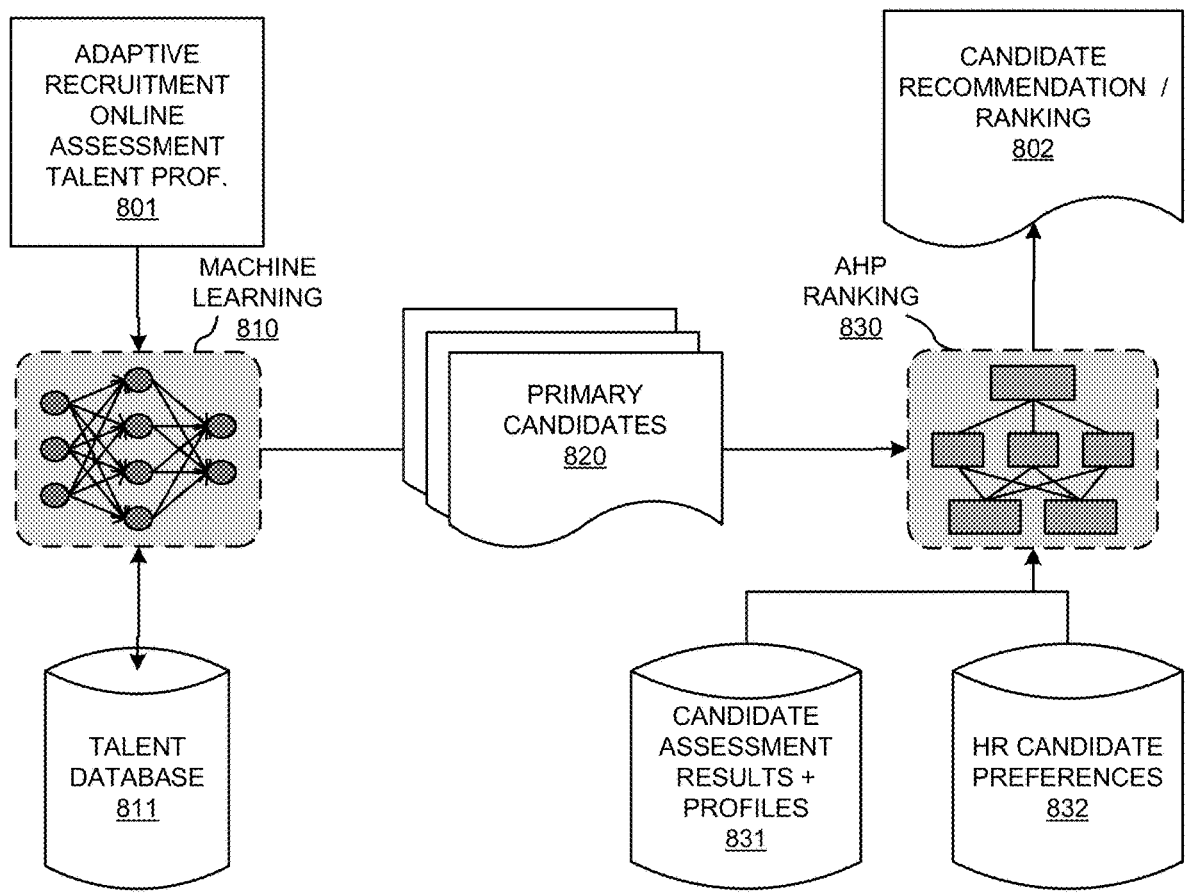
FIG. 8 illustrates an exemplary diagram for a recruitment ranking process using analytic hierarchy process (AHP) in accordance with embodiments of the current invention.

FIG. 8 illustrates an exemplary diagram for a recruitment ranking process using analytic hierarchy process (AHP) in accordance with embodiments of the current invention. A recruitment system offers two-step processes to rank the candidates to be recommended to HR Client. A process 801 offers an online adaptive assessment that comprises both written test and audio interview through a chatbot. Results of the written test and audio interview are summarized and categorized. The assessment results along with job requirements (both functional and non-functional), candidate profiles and other industry specific knowledge are used to train a machine learning model 810. In one embodiment, the random forest model is used to train the machine learning module 810. The random forest (RF) machine model is trained with (1) the Talent Database (811) that contains historical records of candidates who are successfully classified as qualified candidates, and (2) their profile plus their online assessment results. The machine learning module identifies the best candidates for a job in general. However, the best candidate identified by the machine learning model may not be the right candidate for the company because the company may have other considerations or preferences, such as corporate culture, legal compliances, and so on. These preferences are specific to the company or even to the current job opening. In one novel aspect, multi-criteria decision analysis (MCDA), namely, Analytic Hierarch Process (AHP) is programmed to rank the qualified candidates (820) with a set of selection criteria and the candidate-criteria matrix to further identify one or more candidates from the primary candidates selected by machine learning 810. AHP ranking 830 ultimately generates candidate ranking/recommendation 802 for the HR Client. AHP ranking 830 processes the primary candidates further based on candidate assessment results and profile 831 and HR candidate preferences 832.

Figure 9:
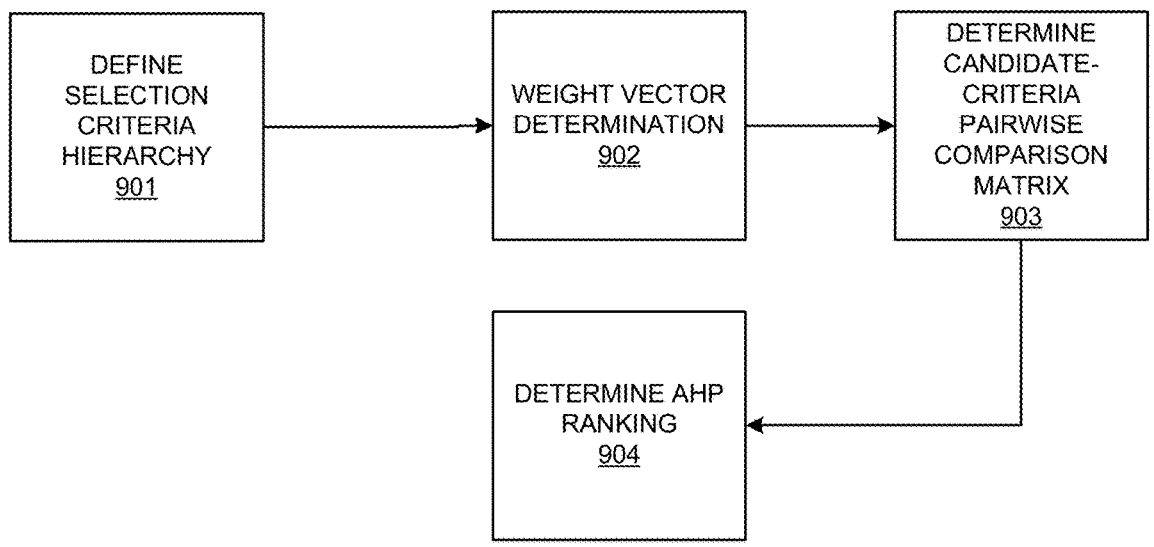
FIG. 9 illustrates an exemplary diagram of the AHP in accordance with embodiments of the current invention.

FIG. 9 illustrates an exemplary diagram of the AHP in accordance with embodiments of the current invention. At step 901, the AHP enables the HR Client to define his selection criteria hierarchy. At step 902, the AHP determines the weight vector based on the HR Client's criteria. At step 903, the AHP computes the candidate-criteria pairwise comparison matrix. At step 904, the AHP determines the APH ranking of the qualified candidates regarding the selection criteria.

Figure 10:
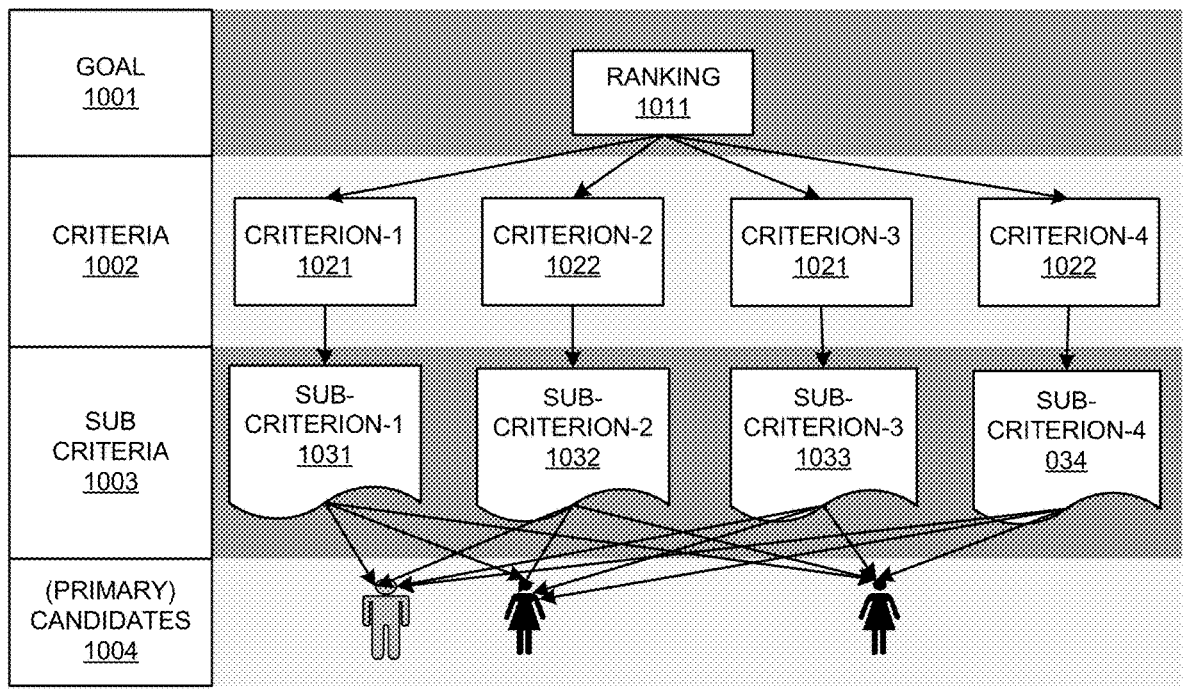
FIG. 10 illustrates exemplary diagrams for defining selection criteria hierarchy in accordance with embodiments of the current invention.

FIG. 10 illustrates exemplary diagrams for defining selection criteria hierarchy in accordance with embodiments of the current invention. The AHP creates a hierarchical structure of basic layers: a goal layer 1001, a criteria layer 1002, a sub-criteria layer 1003, and qualified candidates to be processed by the AHP 1004. Criteria can be further decomposed into sub-criteria. Consider a job opening for software development project manager. Goal 1001 is to rank the qualified candidates in order to find the right candidate. HR client submits its job requirements along with their selection criteria, such as criterion-1 1021, criterion-2 1022, criterion-3 1023, and criterion-4 1024, and sub-criteria, if any, such as sub-criterion-1 1031, sub-criterion-2 1032, sub-criterion-3 1033, and sub-criterion-4 1034. For example, for the job opening of a software development project manager, the HR client defines the selection criteria as technical competency, soft skills, corporate culture, and preferred education level. The sub-criteria of each criterion can further categorize detailed criteria. For example, test score, number of completed projects, average team size, technical writing competency, PMI certified, etc. are sub-criteria for technical competency criterion. Team player, innovative, time management, speech articulation, work from home experiences, etc., are sub-criteria for the soft skills criterion. Community services, volunteering, fitness and wellness, business attire style, carpooling, admiration level of company, etc., are sub-criteria of corporate culture criterion. Education level is the sub-criteria for the education criterion.

Figure 11:
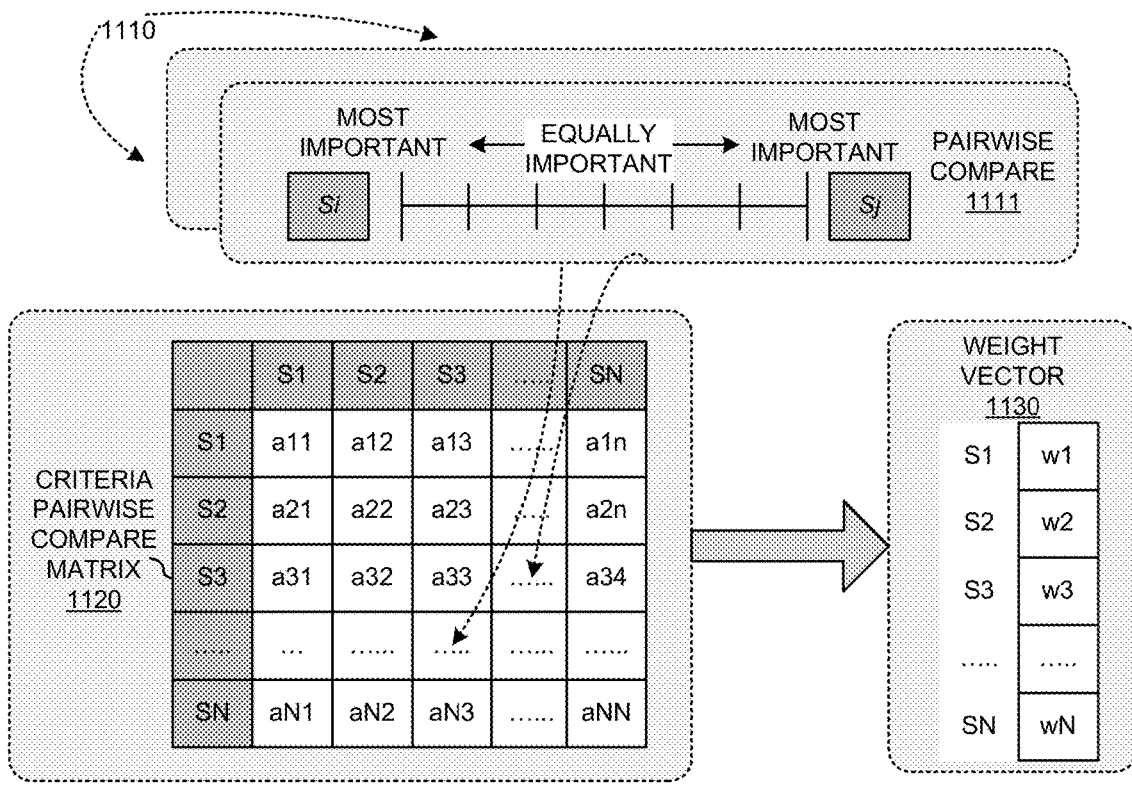
FIG. 11 illustrates exemplary diagrams for weight vector determination in accordance with embodiments of the current invention.

FIG. 11 illustrates exemplary diagrams for weight vector determination of the selection criteria in accordance with embodiments of the current invention. The weight vector denotes the relative ranking of importance of the criteria. The weight vector essentially describes the weight of each criterion in relative to the rest. It is obtained in a pairwise comparison of the importance between two criteria. Let $a_{ij}$ (i, j=1, ..., n) denote the relative weight of criterion i to j, and $a_{ji}=1/a_{ij}$, the results of all pairwise comparisons can be summarized as an n×n reciprocal matrix, for instance, a21 is the reciprocal of a12, etc. The pairwise comparison matrix satisfies transitivity for all pairwise comparisons, i.e., for arbitrary i, j and k, $a_{ik} \cdot a_{kj} = a_{ij}$ (i, j, k=1, ..., n) holds. The principal eigenvector of the matrix is computed and used to normalize the results. The resulting vector can be interpreted as the degree of importance of each criterion, hence the Weight Vector of the selection criteria.

A set of selection criteria is created by the HR. An AHP scale is assigned to each selection criterion. In one embodiment, the AHP scale is assigned by the HR client. Each pair of the selection criteria generates a pairwise comparison, such as 1111. The set of the pairwise comparison 1110 includes a complete set of pairwise selection criteria comparison. Each pairwise comparison result is an element in the pairwise comparison matrix 1120. Pairwise comparison matrix 1120 is an n×n reciprocal matrix. For example, the HR defines four selection criteria {S1, S2, S3, S4} for software development project manager are {technical competency, soft skills, cultural, salary} with four selected qualified candidates. Pairwise comparison 1111 compares the importance of S1 S2, which are the technical competency and soft skills. The result of the comparison is entered to the pairwise comparison matrix 1120. An exemplary table 1120 with selection criteria {S1, S2, S3, S4}={technical competency, soft skills, cultural, salary}.

TABLE-1

Selection criteria pairwise comparison matrix

|  | Education | Soft Skills | Culture | Technical |
| --- | --- | --- | --- | --- |
| Education | 1 | 1/6 | 1/3 | 1/5 |
| Soft Skills | 6 | 1 | 5 | 3 |
| Culture | 3 | 1/5 | 1 | 1 |
| Technical | 5 | 1/3 | 1 | 1 |

The interpretation of the pairwise scale is like the following. A 9-point scale is used for the comparison, whereby "1" means "equal importance" when comparing two elements, "9" means "element A is extremely more important than element B". When Soft Skills is compared to the other criteria, it scores a "5" over culture, a "3" over technical and a "6" over Education. It means HR Client believes Soft Skills are more important than Technical, Culture, and Education. When comparing Education to Soft Skills, the importance is ⅙, which is simply the reciprocal of the importance between Soft Skills to Education.

Once the pairwise comparison matrix is obtained, the principal eigenvector of the matrix is computed and used to normalize the results. Weight vector 1130 is generated based on 1120. For example, based on Table-1 selection criteria pairwise comparison matrix, the weight vector for {S1, S2, S3, S4}=(Education, Soft Skills, Cultural, Technical) equals (0.06, 0.57, 0.16, 0.21), respectively.

The next step is to rank candidates with each other for each selection criteria. There are two measurement alternatives: In relative measurement we compare each alternative with other alternatives (as shown in FIG. 11), and in absolute measurement we compare each alternative with one ideal alternative we know of. The latter is essentially a rating approach. Relative measurement is descriptive and is conditioned by our observational ability and experience. Rating approach is normative, conditioned by what we know is best, which of course is relative.

Figure 12:
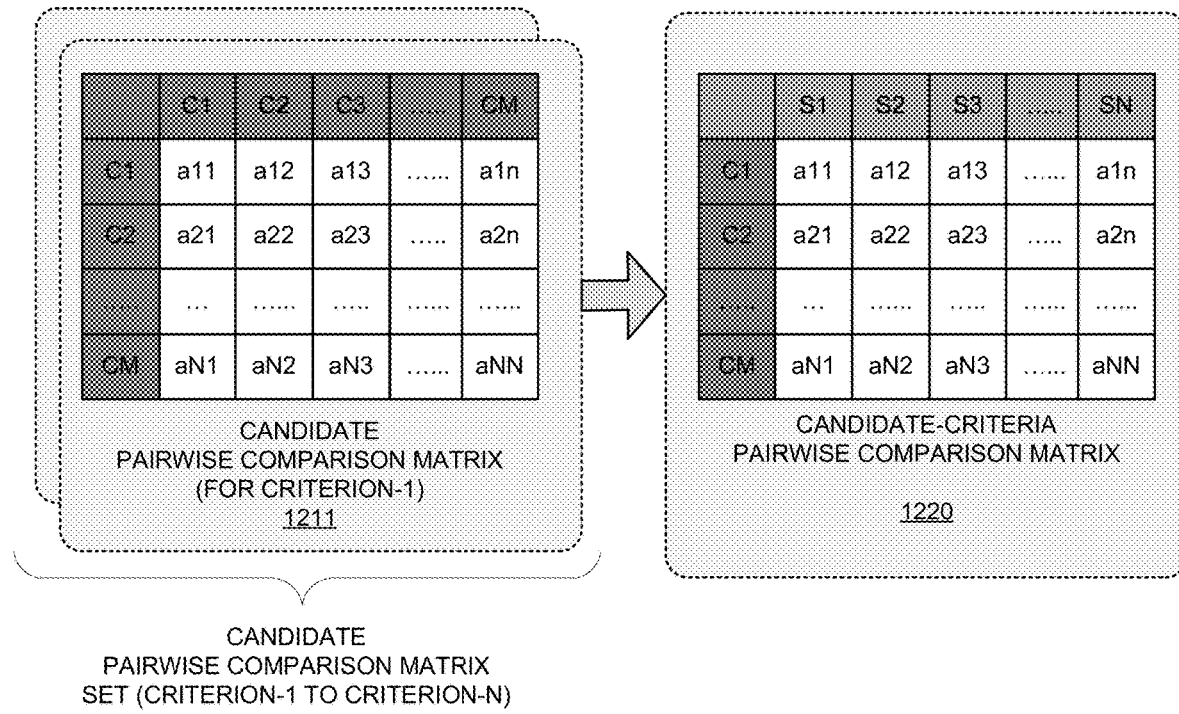
FIG. 12 illustrates exemplary diagrams for determining the candidate-criteria pairwise comparison matrix in accordance with embodiments of the current invention.

FIG. 12 illustrates exemplary diagrams for determining the candidate-criteria pairwise comparison matrix in accordance with embodiments of the current invention. The candidate-criteria matrix 1220 is a n×m pairwise comparison matrix of (candidate, criteria). First, a candidate pairwise comparison matrix 1211 is generated for a selection criterion S1. The candidate pairwise comparison matrix 1211 contains ranking by comparing one candidate to the other candidate for each criterion similar to the pairwise comparison of selection criteria above. Criteria can be conceptual, for instance, consider Education as a selection criterion. One can compare a candidate has better education than the other candidates by using the subjective relative measures. To reduce biases of the evaluator, we can first define clear operational definitions of the criterion. For instance, selection criterion Education for the job opening can be defined by the educational levels the candidate has achieved, e.g. high school, community college, college, master or doctoral.

In one embodiment, the pairwise comparison assigns a set of preference value to each selection criterion. In one embodiment, the preference value for each selection criterion is based on one or more predefined factors for example, for the software development project manager opening, the HR Client indicates his highest preference is assigned to college education, followed by Master, Doctoral, Community and High School, numerically as 5, 4, 3, 2, 1, as in a Likert scale where "5" indicates the best This is essentially the rating of the selection preferences.

In another embodiment, the pairwise comparison uses the rating approach. The ratings will be normalized to indicate the relative importance among the candidates. For example, when considering the pairwise comparison of Candidate-1 to the other three candidates, we simply normalize the other rating with respect to the rating of Candidate-1. The normalization also preserves the relative importance of among all candidates. Table-2 illustrates a candidate pairwise comparison matrix for criterion Education.

TABLE-2

Candidate pairwise comparison matrix (Education)

|        | Cand-1 | Cand-2 | Cand-3 | Cand-4 |
|--------|--------|--------|--------|--------|
| Cand-1 | 1      | 1.25   | 2.5    | 1.67   |
| Cand-2 | 0.8    | 1      | 2      | 1.33   |
| Cand-3 | 0.4    | 0.5    | 1      | 0.67   |
| Cand-4 | 0.6    | 0.75   | 1.5    | 1      |

A candidate pairwise comparison matrix 1210 includes all candidate pairwise comparison matrix for each selection criteria. The principal eigenvector of this matrix is computed and is used to normalize the data. The results are the weights for each candidate for the Education criterion: (Candidate-1, Candidate-2, Candidate-3, Candidate-4)=(0.68, 0.17, 0.10, 0.05), respectively. For each criterion, the score of its operational definition is derived from the application (e.g. attributes or aggregate such as test scores, etc.), and they are compared to each candidate in either the rating approach or the AHP pairwise comparison approach.

TABLE-3

Candidate-criteria pairwise comparison matrix

|        | Education | Soft Skills | Culture | Technical |
|--------|-----------|-------------|---------|-----------|
| Cand-1 | 0.68      | 0.07        | 0.04    | 0.28      |
| Cand-2 | 0.17      | 0.18        | 0.54    | 0.34      |
| Cand-3 | 0.10      | 0.13        | 0.11    | 0.30      |
| Cand-4 | 0.05      | 0.62        | 0.31    | 0.08      |

Figure 13:
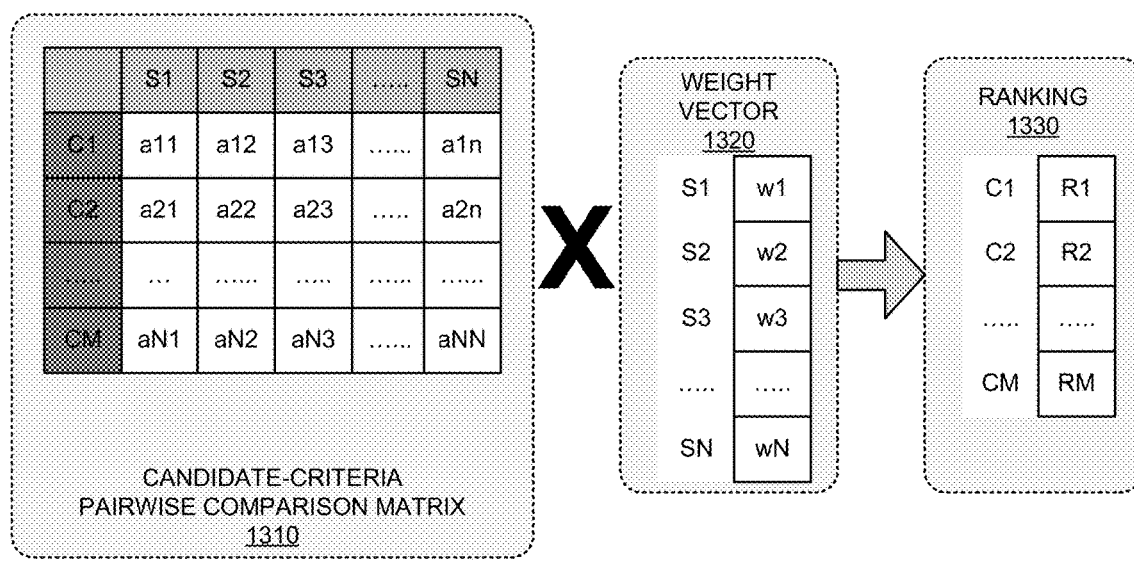
FIG. 13 illustrates exemplary diagrams for ranking procedure in accordance with embodiments of the current invention.

FIG. 13 illustrates exemplary diagrams for ranking procedure in accordance with embodiments of the current invention. Upon obtaining the candidate-criteria pairwise comparison matrix 1310, the AHP obtains the final ranking for each candidate based the weight vector 1320. The ranking vector 1330 is obtained by multiplying the candidate-criteria pairwise comparison matrix 1310 with the weight vector 1320. An exemplary ranking result based on candidate-criteria pairwise matrix as in Table-3 and an exemplary weight vector as depicted in the following table:

TABLE 4

AHP Ranking Generation

|     | Edu  | S Skill | Cult | Tech |   | W Vec |   | Rank |
|-----|------|---------|------|------|---|-------|---|------|
| c-1 | 0.68 | 0.07    | 0.04 | 0.28 | × | 0.06  | = | 0.15 |
| c-2 | 0.17 | 0.18    | 0.54 | 0.34 |   | 0.57  |   | 0.27 |
| c-3 | 0.10 | 0.13    | 0.11 | 0.30 |   | 0.16  |   | 0.16 |
| C-4 | 0.05 | 0.62    | 0.31 | 0.08 |   | 0.21  |   | 0.42 |

Among the four qualified candidates identified by the machine learning module 810, based on the specific selection criteria from the HR Client, we conclude that Candidate-4 stands out as a right candidate, followed by Candidate-2, Candidate-3 and Candidate-1.

Figure 14:
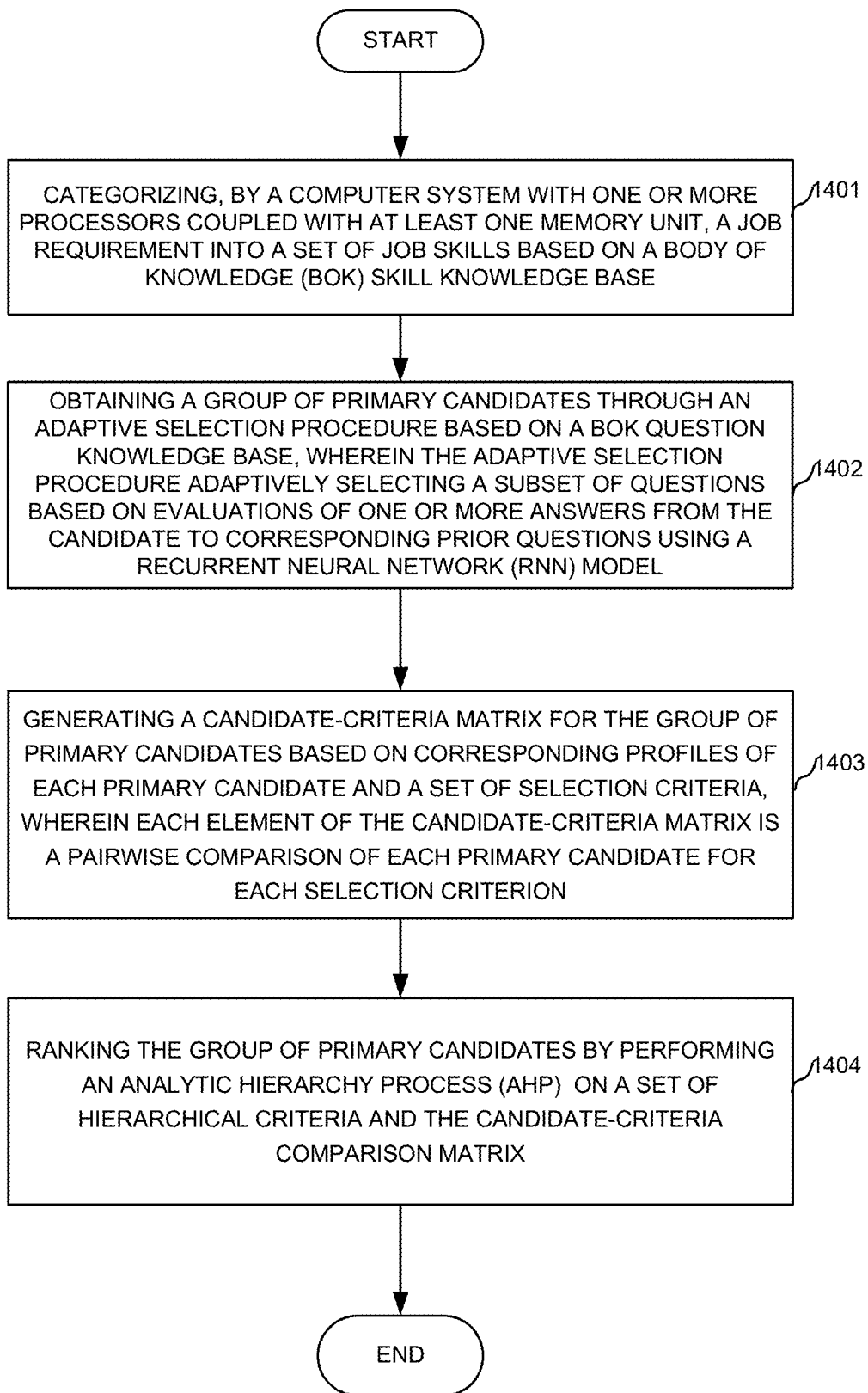
FIG. 14 illustrates an exemplary flow chart for generating candidate ranking using the AHP in accordance with embodiments of the current invention.

FIG. 14 illustrates an exemplary flow chart for generating candidate ranking using the AHP computer system in accordance with embodiments of the current invention. At step 1401, the computer system categorizes a job requirement into a set of job skills based on a body of knowledge (BOK) skill knowledge base. At step 1402, the computer system obtains a group of primary candidates through an adaptive selection procedure based on a BOK question knowledge base, wherein the adaptive selection procedure adaptively selecting a subset of questions based on evaluations of one or more answers from the candidate to corresponding prior questions using a recurrent neural network (RNN) model. At step 1403, the computer system generates a candidate-criteria matrix for the group of primary candidates based on corresponding profiles of each primary candidate and a set of selection criteria, wherein each element of the candidate-criteria matrix is a pairwise comparison of each primary candidate for each selection criterion. At step 1404, the computer system ranks the group of primary candidates by performing an analytic hierarchy process (AHP) on a set of hierarchical criteria and the candidate-criteria pairwise comparison matrix.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
    categorizing, by a computer system with one or more processors coupled with at least one memory unit, a job requirement into a set of job skills based on a body of knowledge (BOK) skill knowledge base;
    obtaining a group of primary candidates through an adaptive selection procedure based on a BOK question knowledge base, wherein the adaptive selection procedure adaptively selecting a subset of questions based on evaluations of one or more answers from the candidate to corresponding prior questions using a recurrent neural network (RNN) model;
    generating a candidate-criteria matrix for the group of primary candidates based on corresponding profiles of each primary candidate and a set of selection criteria, wherein each element of the candidate-criteria matrix is a pairwise comparison of each primary candidate for each selection criterion; and
    ranking the group of primary candidates by performing an analytic hierarchy process (AHP) using a multi-criteria decision analysis (MCDA) based on a set of hierarchy criteria and the candidate-criteria matrix.

2. The method of claim 1, wherein the ranking is generated by multiplying the candidate-criteria matrix with a weight vector, and wherein each element of the weight vector is a weight value of a normalized relative importance.

3. The method of claim 2, wherein the weight vector is a principal eigenvector of a pairwise comparison matrix, and wherein each element of the pairwise comparison matrix is a factor of a pair-wise comparison of two corresponding selection factors.

4. The method of claim 3, wherein the pairwise comparison matrix is a relative comparison matrix, and wherein each element of the pairwise comparison matrix is a relative value comparing with other elements.

5. The method of claim 3, wherein the pairwise comparison matrix is an absolute comparison matrix, and wherein each element of the pairwise comparison matrix is a value comparing to an ideal value.

6. The method of claim 1, wherein the subset of questions is selected from a generated question bank comprising a list of questions based on the set of job skills and the BOK question knowledge base, and the adaptive selection procedure further comprising:
    generating a feedback report for the candidate, wherein the feedback report using the RNN model based on evaluations of answers from the candidate and a BOK candidate knowledge base, wherein the BOK candidate knowledge base receives updates from the computer system.

7. The method of claim 6, wherein each job skill has a set of attributes comprising a multi-level industry taxonomy, a skill level, and cross disciplinary references.

8. The method of claim 7, wherein each question in the BOK question knowledge base has a skill level attribute, and wherein the generated question bank includes questions of different skill levels based on the skill level of the job skill attributes.

9. The method of claim 6, further comprising:
    obtaining candidate information prior to the interview; and
    generating a candidate profile and authentication information.

10. The method of claim 6, wherein the feedback report includes a deficiency report, and wherein a training recommendation list derived from the deficiency report is included.

11. The method of claim 6, wherein the feedback report includes a strength report, and wherein a matching opening recommendation list derived from the strength report is included.

12. An apparatus comprising:
    a network interface that connects the apparatus to a communication network;
    a memory; and
    one or more processors coupled to one or more memory units, the one or more processors configured to
        categorize a job requirement into a set of job skills based on a body of knowledge (BOK) skill knowledge base;
        obtain a group of primary candidates through an adaptive selection procedure based on a BOK question knowledge base, wherein the adaptive selection procedure adaptively selecting a subset of questions based on evaluations of one or more answers from the candidate to corresponding prior questions using a recurrent neural network (RNN) model;
        generate a candidate-criteria matrix for the group of primary candidates based on corresponding profiles of each primary candidate and a set of selection criteria, wherein each element of the candidate-criteria matrix is a pairwise comparison of each primary candidate for each selection criterion; and
        rank the group of primary candidates by performing an analytic hierarchy process (AHP) using a multi-criteria decision analysis (MCDA) based on a set of hierarchy criteria and the candidate-criteria matrix.

13. The apparatus of claim 12, wherein the ranking is generated by multiplying the candidate-criteria matrix with a weight vector, and wherein each element of the weight vector is a weight value of a normalized relative importance.

14. The apparatus of claim 13, wherein the weight vector is a principal eigenvector of a pairwise comparison matrix, and wherein each element of the pairwise comparison matrix is a factor of a pair-wise comparison of two corresponding selection factors.

15. The apparatus of claim 13, wherein the pairwise comparison matrix is a relative comparison matrix, and wherein each element of the pairwise comparison matrix is a relative value comparing with other elements.

16. The apparatus of claim 15, wherein the pairwise comparison matrix is an absolute comparison matrix, and wherein each element of the pairwise comparison matrix is a value comparing to an ideal value.

17. The apparatus of claim 12, wherein each job skill has a set of attributes comprising a multi-level industry taxonomy, a skill level, and cross disciplinary references.

18. The apparatus of claim 12, wherein each question in the BOK question knowledge base has a skill level attribute, and wherein the generated question bank includes questions of different skill levels based on the skill level of the job skill attributes.

19. The apparatus of claim 12, wherein the processor is further configured to: obtain candidate information prior to the interview; and generate a candidate profile and authentication information.

20. The apparatus of claim 19, wherein the candidate profile is generated from the candidate information using the RNN model based on the BOK candidate knowledge base.

* * * * *